United States Patent
Simpson et al.

(10) Patent No.: US 7,191,199 B2
(45) Date of Patent: Mar. 13, 2007

(54) METHOD AND DEVICE FOR COMPUTING AN ABSOLUTE DIFFERENCE

(75) Inventors: Richard D. Simpson, Bedford (GB); Graeme Swanson, Peterborough (GB); Konstantinos Venos, London (GB)

(73) Assignee: Texas Instruments Incorporated, Dallas, TX (US)

( * ) Notice: Subject to any disclaimer, the term of this patent is extended or adjusted under 35 U.S.C. 154(b) by 660 days.

(21) Appl. No.: 10/640,453

(22) Filed: Aug. 13, 2003

(65) Prior Publication Data

US 2004/0034680 A1   Feb. 19, 2004

(30) Foreign Application Priority Data

Aug. 19, 2002 (GB) ................... 219199.7

(51) Int. Cl.
*G06F 15/00* (2006.01)

(52) U.S. Cl. .................................. 708/201
(58) Field of Classification Search ................. 708/201
See application file for complete search history.

(56) References Cited

U.S. PATENT DOCUMENTS

| | | | |
|---|---|---|---|
| 4,218,751 A | 8/1980 | McManigal | |
| 4,982,352 A | 1/1991 | Taylor et al. | |
| 5,251,164 A | 10/1993 | Dodson et al. | |
| 5,373,459 A * | 12/1994 | Taniguchi | ............ 708/201 |
| 5,546,335 A * | 8/1996 | Lee | ............ 708/201 |
| 5,610,850 A | 3/1997 | Uratani et al. | |
| 5,835,389 A | 11/1998 | Wong | |

FOREIGN PATENT DOCUMENTS

EP    0295788 A2    5/1988
JP    580132861 A   8/1983

* cited by examiner

*Primary Examiner*—Chuong D. Ngo
(74) *Attorney, Agent, or Firm*—Robert D. Marshall, Jr.; W. James Brady; Frederick J. Telecky, Jr.

(57) ABSTRACT

Computing an absolute difference includes receiving a first value and a second value. Propagate terms are determined according to the first value and the second value at one or more adders (24). The second value is subtracted from the first value using the propagate terms to yield a subtraction difference. It is determined at one or more correctors (26) whether the subtraction difference is negative. If the subtraction difference is negative, the subtraction difference is modified according to the propagate terms to compute an absolute difference between the first value and the second value. Otherwise, the subtraction difference is reported as the absolute difference between the first value and the second value.

10 Claims, 3 Drawing Sheets

METHOD AND DEVICE FOR COMPUTING AN ABSOLUTE DIFFERENCE

This application claims priority to S.N. 219199.7, filed in Great Britain on Aug. 19, 2002 and from which priority under 35 U.S.C §119 is claimed for the above-identified application.

TECHNICAL FIELD OF THE INVENTION

This invention relates generally to the field of arithmetic and logic units and, more specifically, to a method and device for computing an absolute difference.

BACKGROUND OF THE INVENTION

Calculating an absolute difference between two values using an arithmetic and logic unit involves determining the positive difference between the two values. Merely subtracting one value from the other value does not necessarily yield the absolute difference, since the subtraction may yield a negative difference. Typically, other calculations are performed to determine whether a difference is negative and to change a negative difference to a positive difference. Consequently, efficiently calculating an absolute difference has posed challenges.

SUMMARY OF THE INVENTION

In accordance with the present invention, disadvantages and problems associated with previous techniques for calculating an absolute difference may be reduced or eliminated.

According to one embodiment of the present invention, computing an absolute difference includes receiving a first value and a second value. Propagate terms are determined according to the first value and the second value at one or more adders. The second value is subtracted from the first value using the propagate terms to yield a subtraction difference. It is determined at one or more correctors whether the subtraction difference is negative. If the subtraction difference is negative, the subtraction difference is modified according to the propagate terms to compute an absolute difference between the first value and the second value. Otherwise, the subtraction difference is reported as the absolute difference between the first value and the second value.

Certain embodiments of the invention may provide one or more technical advantages. A technical advantage of one embodiment may be that a subtraction difference between two values is calculated and corrected if needed in order to determine the absolute difference between the two values. The embodiment may require fewer computations than techniques that, for example, perform multiple subtractions to determine one absolute difference. Another technical advantage of one embodiment may be that a propagate term computed during the calculation of the subtraction difference is used to correct the subtraction difference. Using the already computed propagate term reduces the need to perform additional calculations to correct the subtraction difference. Accordingly, the embodiment may provide for a more efficient manner of calculating an absolute difference.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
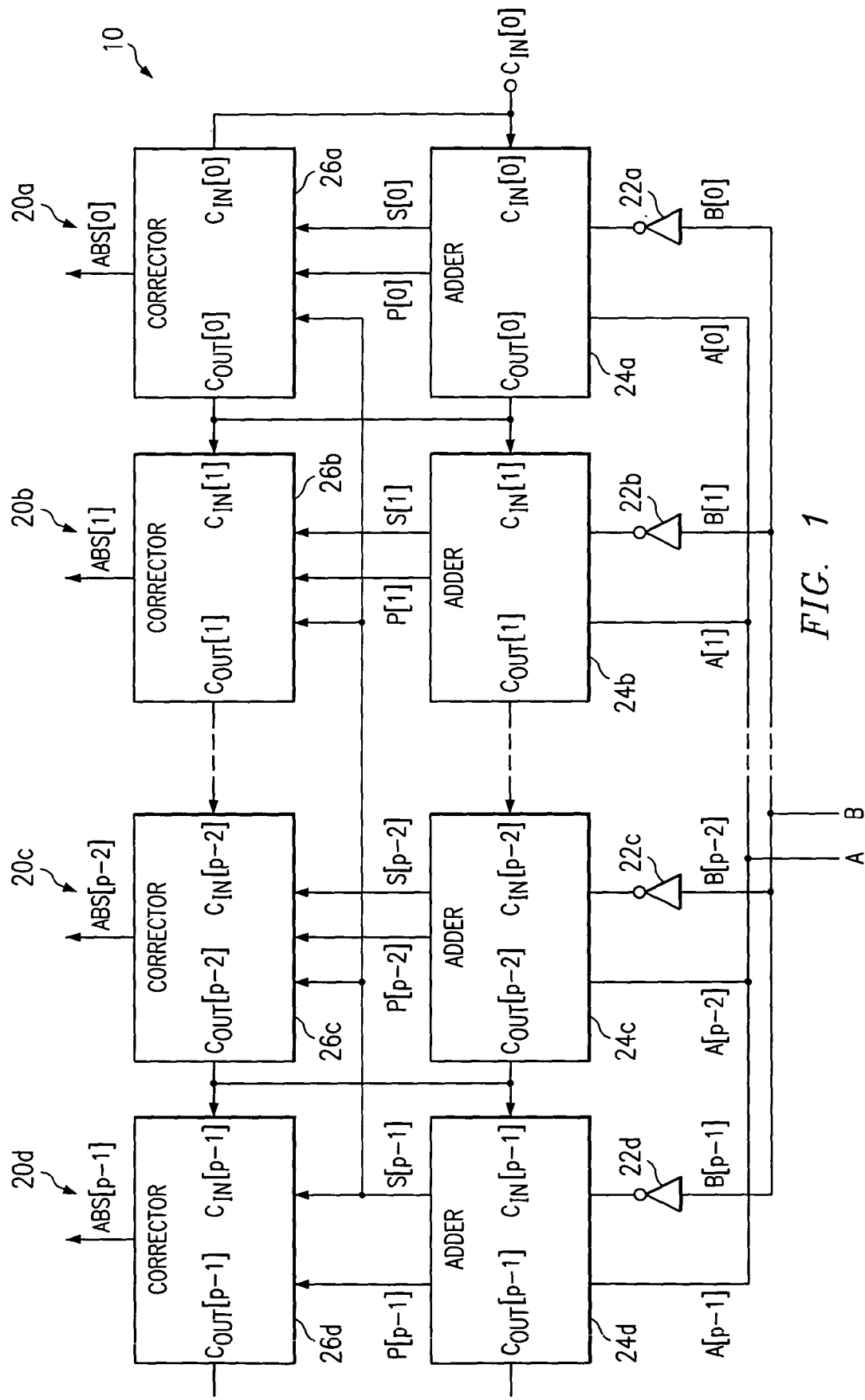
FIG. 1 is a diagram illustrating one embodiment of an absolute difference device for calculating an absolute difference between two values.
Figure 2:
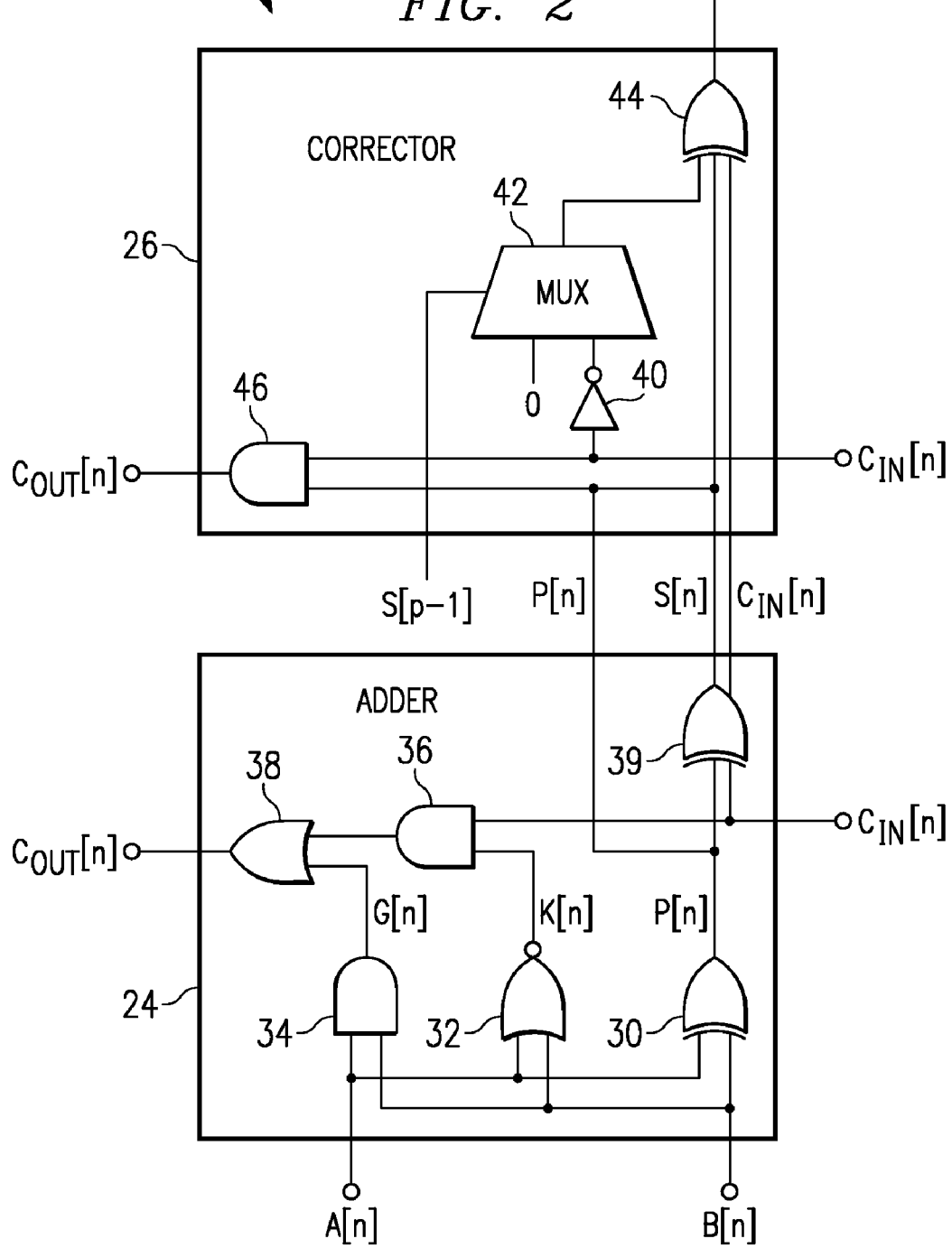
FIG. 2 is diagram illustrating one embodiment of one-bit absolute difference unit.
Figure 3:
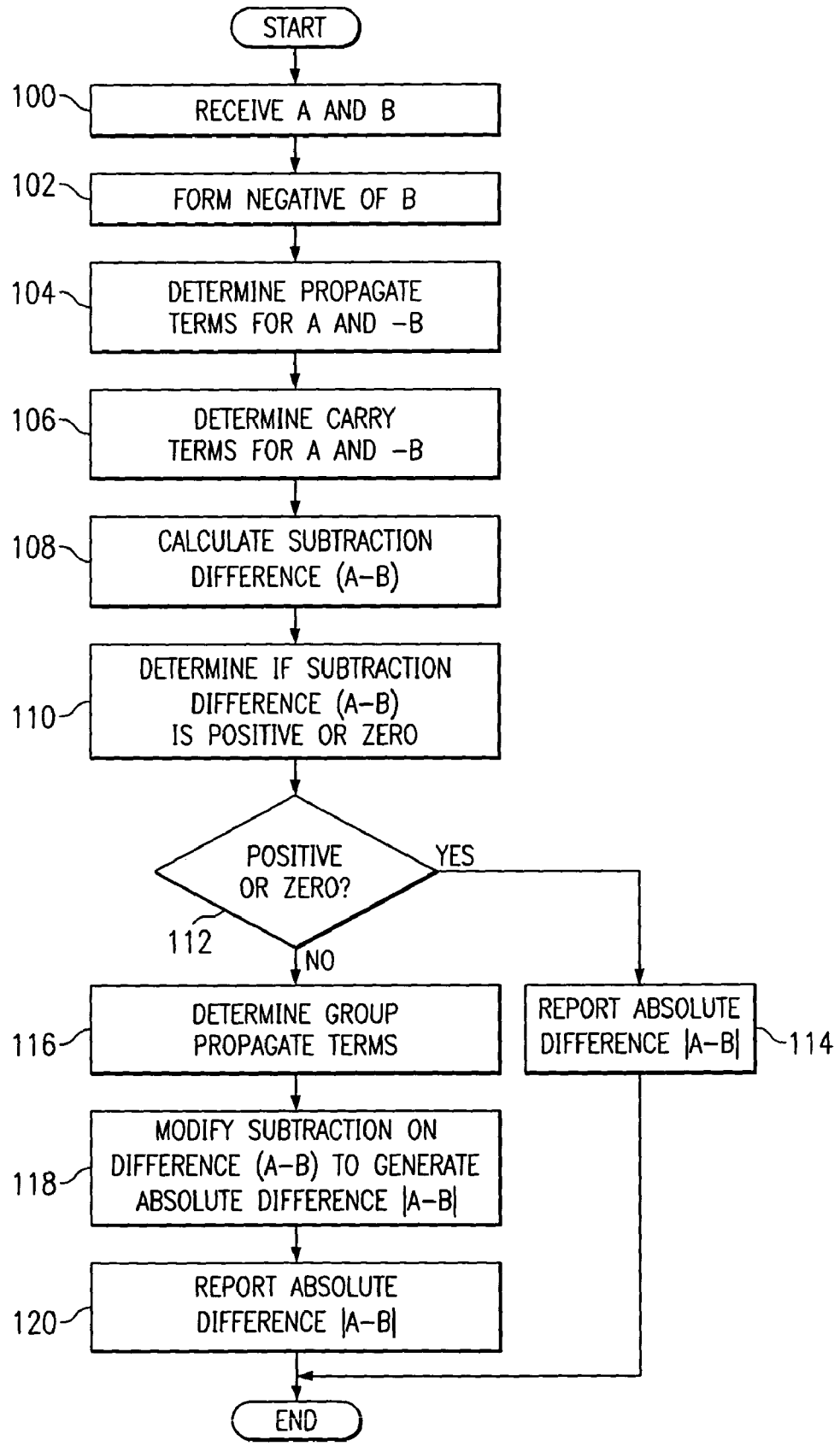
FIG. 3 is a flowchart illustrating one embodiment of a method for calculating an absolute difference between two values.

Embodiments of the present invention and its advantages may be understood by referring to FIGS. 1 through 3 of the drawings, like numerals being used for like and corresponding parts of the various drawings.

FIG. 1 is a diagram illustrating one embodiment of an absolute difference device 10 for calculating an absolute difference between two values. Given two values A and B, either A−B or B−A yields the absolute difference |A−B|=|B−A|. Basically, if A>B, then A−B yields the absolute difference; if A<B, then B−A yields the absolute difference; and if A=B, then either A−B or B−A yields the absolute difference. According to the embodiment, absolute difference device 10 calculates propagate terms in order to subtract one value from another value to determine a subtraction difference. The subtraction difference is checked to determine whether the subtraction difference is positive or negative. If the subtraction difference is negative, absolute difference device 10 uses the propagate terms to modify the subtraction difference to generate the absolute difference.

Absolute difference device 10 comprises p one-bit absolute difference units 20, where p indicates the number of bits of input values A and B that may be processed by absolute difference device 10. The bits of A may be represented by A[n], where A=A[p−1], . . . , A[n], . . . , A[0], and p−1 indicates the most significant bit. The bits for B may be written in a similar manner.

A one-bit absolute difference unit 20 comprises an inverter 22, an adder 24, and a corrector 26. To subtract B from A, the negative of B, represented by −B, is calculated and added to A. −B is calculated by inverting bits B[n] using inverter 22 and adding one to the inverted bits. Adder 24 adds A[n] and −B[n] to calculate a subtraction difference term S[n] that is used to generate subtraction difference S=S[p−1], . . . , S[n], . . . , S[0]. Adder 24 receives a carry in term $C_{in}[n]$ and outputs a carry out term $C_{out}[n]$, where $C_{in}[n+1]=C_{out}[n]$. Carry in term $C_{in}[n]$ is used to calculate S[n], and carry out term $C_{out}[n]$ is used to calculate S[n+1]. Adder 24 calculates a propagate term P[n] in order to add A[n] and −B[n]. Adder 24 may add A[n] and −B[n] according to the values listed in TABLE 1. Adder 24 is described in more detail in reference to FIG. 2.

TABLE 1

| A[n] | B[n] | $C_{in}$ | $C_{out}$ | S[n] |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |

TABLE 1-continued

| A[n] | B[n] | $C_{in}$ | $C_{out}$ | S[n] |
|---|---|---|---|---|
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Corrector 26 receives subtraction difference term S[n] from adder 24 and determines whether subtraction difference term S[n] needs to be modified to generate an absolute difference. If needed, corrector 26 modifies subtraction difference term S[n] using propagate term P[n] to generate an absolute difference term ABS[n] that is used to form absolute difference ABS=ABS[p−1], . . . , ABS[n], . . . , ABS[0]. Corrector 26 receives carry in term $C_{in}$[n] and outputs carry out term $C_{out}$[n]. Corrector 26 is described in more detail with reference to FIG. 2.

FIG. 2 is diagram illustrating one embodiment of one-bit absolute difference unit 20. One-bit absolute difference unit 20 includes adder 24 and corrector 26.

Adder 24 comprises an addition gate 30, a not-OR (NOR) gate 32, AND gates 34 and 36, an OR gate 38, and an addition gate 39. Addition gate 30 generates propagate term P[n] from inputs A[n] and B[n]. Propagate term P[n] is used to indicate that if A[n]=1 and B[n]=0, or if A[n]=0 and B[n]=1, then carry in term $C_{in}$[n] equals carry out term $C_{out}$[n]. NOR gate 32 is used to generate kill term K[n], which is used to indicate that if A[n]=B[n]=0, then carry out term $C_{out}$[n]=0. AND gate 34 is used to calculate generate term G[n], which is used to indicate that if A[n]=B[n]=1, then carry out term $C_{out}$=1.

AND gate 36 and OR gate 38 generate carry out term $C_{out}$[n] from input carry in term $C_{in}$[n] according to the rules specified by generate term G[n], kill term K[n], and propagate term P[n]. In this example, AND gate 36 and OR gate 38 generate carry out term $C_{out}$[n] according to propagate term P[n] even though propagate term P[n] is not used as an input. Addition unit 39 generates subtraction difference term S[n] from carry in term $C_{in}$[n] and propagate term P[n].

Corrector 26 comprises an inverter 40, a multiplexer (MUX) 42, an addition gate 44, and an AND gate 46. Inverter 40 inverts carry in term $C_{in}$[n] to generate $C_{in}$'[n]. Multiplexer 42 determines whether the subtraction difference S is positive or negative. If the subtraction difference S is negative, multiplexer 42 determines whether subtraction difference term S[n] needs to be inverted, and signals addition unit 44 to invert the subtraction difference term S[n] if needed.

Multiplexer 42 may check the most significant bit of the subtraction difference S[p−1] to determine if the subtraction difference is positive or negative. If S[p−1]=0, then the subtraction difference is positive, and if S[p−1]=1, then the subtraction difference is negative. If the subtraction difference is positive, multiplexer 42 transmits a value of zero to addition unit 44. If the subtraction difference is negative, multiplexer 42 checks $C_{in}$'[n] to determine whether subtraction difference term S[n] needs to be inverted. If $C_{in}$'[n]=0, then multiplexer 42 signals addition unit 44 to not invert subtraction difference term S[n]. If $C_{in}$'[n]=1, then multiplexer 42 signals addition unit 44 to invert subtraction difference term S[n]. AND gate 46 receives carry in term $C_{in}$[n] and propagate term P[n] to generate carry out term $C_{out}$[n].

FIG. 3 is a flowchart illustrating one embodiment of a method for calculating an absolute difference between two values. According to the embodiment, propagate terms are calculated in order to subtract one value from another value to yield a subtraction difference. The subtraction difference is checked to determine whether the subtraction difference is positive or negative. If the subtraction difference is negative, the subtraction difference is modified using the propagate terms to generate the absolute difference.

The method begins at step 100, where A and B are received at absolute difference device 10. To illustrate the method, the absolute difference is calculated for two pairs of values, pair $A_1$ and $B_1$ and pair $A_2$ and $B_2$, where $A_1$=$B_2$, and $A_2$=$B_1$. In practice, however, the absolute difference for only one pair of values is typically calculated. According to one embodiment, the method performs one subtraction A−B in order to determine the absolute difference |A−B|. In contrast, other techniques require calculating both A−B and B−A and selecting the correct result in order to determine the absolute difference |A−B|. In the illustrated example, $A_1$=$B_2$=$01101111$ in the base 2 number system, which equals 111 in the base 10 number system, and $B_1$=$A_2$=$00100111$ in base 2, which equals 39 in base 10. For values $A_1$ and $B_1$, $A_1$−$B_1$=$01001000_2$, which equals $72_{10}$, yields the absolute difference because $A_1$>$B_1$. The difference $A_2$−$B_2$=$10111000_2$, which is equal to $-72_{10}$, does not yield the absolute difference because $A_2$<$B_2$.

To subtract B from A, the negative of B, represented by −B, is formed at step 102. −B may be formed by inverting each B[n] at inverters 22 and setting $C_{in}$[0]=1. As used in this document, "each" refers to each member of a set or each member of a subset of a set. In the illustrated example, the negative of $B_1$ is −$B_1$=$11011000$, and the negative of $B_2$ is −$B_2$=$10010000$. Propagate terms for A and −B are determined at step 104. The propagate terms P[n] may be determined at addition units 30 according to Equation (1):

$$P[n] = A[n] \text{ XOR } B[n] \quad (1)$$

In the illustrated example, the propagate terms P[n] may be described by Equations (2):

$$\begin{array}{rl} A_1 - B_1 & 01101111 \ \ A_1 \\ & +11011000 \ \ B_1' \\ & \overline{10110111} \ \ P_1[n] \end{array} \quad (2)$$

$$\begin{array}{rl} A_2 - B_2 & 00100111 \ \ A_2 \\ & +10010000 \ \ B_2' \\ & \overline{10110111} \ \ P_2[n] \end{array}$$

The carry terms for A and −B are determined at step 106. In the illustrated example, the carry terms $C_{in}$[n]=$C_{out}$[n−1] =C[n−1] may be determined at AND gate 36 and OR gate 38 according to Equation (3):

$$C_{out}[n] = A[n] \text{ AND } B[n] + B[n] \text{ AND } C_{in}[n] + A[n] \text{ AND } C_{in}[n] \quad (3)$$

The carry terms C[n−1] may be described by Equations (4);

$$\begin{array}{rl} A_1 - B_1 & 01101111 \ \ A_1 \\ & +11011000 \ \ B_1' \end{array} \quad (4)$$

-continued $$
\begin{array}{lll}
& 10110111 & P_1[n] \\
& \underline{111111111} & C_1[n-1] \\
\\
A_2 - B_2 & 00100111 & A_2 \\
& +10010000 & B'_2 \\
& 10110111 & P_2[n] \\
& 000001111 & C_2[n-1]
\end{array}
$$

Subtraction difference S is calculated at step 108. The subtraction difference terms S[n] may be determined at addition gate 39 according to Equation (5):

$$S[n]=P[n] \text{ XOR } C[n-1] \tag{5}$$

In the illustrated example, the subtraction difference terms S[n] may be described by Equations (6):

$$
\begin{array}{lll}
A_1 - B_1 & 01101111 & A_1 \\
& +11011000 & B'_1 \\
& 10110111 & P_1[n] \\
& \underline{11111111} & C_1[n-1] \\
& 01001000 & S_1[n] \\
\\
A_2 - B_2 & 00100111 & A_2 \\
& 10010000 & B'_2 \\
& 10110111 & P_2[n] \\
& \underline{000001111} & C_2[n-1] \\
& 00111000 & S_2[n]
\end{array} \tag{6}
$$

The subtraction difference is checked at multiplexer 42 to determine whether subtraction difference A−B is positive or zero at step 110. The most significant bit of the subtraction difference, or the most significant subtraction difference term, indicates whether the subtraction difference is positive or zero. For example, S[p−1]=0 indicates that the subtraction difference is positive or zero, and S[p−1]=1 indicates that the subtraction difference is negative. In the illustrated example, $S_1[7]=0$, indicating that the subtraction difference $A_1-B_1$ is positive or zero. In contrast, $S_2[7]=0$, indicating that the subtraction difference $A_2-B_2$ is negative. If the subtraction difference is positive or zero at step 112, the method proceeds to step 114, where the absolute difference |A−B| is reported. In the illustrated example, subtraction difference $A_1-B_1$ is reported as the absolute difference $|A_1-B_1|$. After reporting the absolute difference |A−B|, the method terminates.

If the subtraction difference is negative at step 112, the method proceeds to step 116, where group propagate terms are determined. The group propagate terms are determined from the propagate terms and are used to invert incorrect bits of the subtraction difference in order to generate the absolute difference. Propagate terms include a first false propagate term P[k], which indicates that subtraction difference term S[k+1] immediately following requires inversion. Group propagate terms GP[n] may be calculated at multiplexer 42 according to Equation (7):

$$GP[n]=P[n] \text{ AND } P[n-1] \text{ AND } P[n-2] \text{ AND } \ldots \tag{7}$$

Accordingly, if P[n]=0, then GP[j]=0 for j=n, . . . , p. In the illustrated example, group propagate terms GP[n] for $A_2-B_2$ may be described by Equation (8):

$$
\begin{array}{lll}
A_2 - B_2 & 00100111 & A_2 \\
& 10010000 & B'_2 \\
& 10110111 & P_2[n] \\
& \underline{000001111} & C_2[n-1] \\
& \underline{10111000} & S_2[n] \\
& 00000111 & GP_2[n]
\end{array} \tag{8}
$$

Group propagate terms indicate which bits of the subtraction difference need to be inverted to generate an absolute difference.

The subtraction difference is modified according to the group propagate terms to generate the absolute difference |A−B| at step 118. The subtraction difference may be modified by inverting bits of the subtraction difference according to the group propagate terms at addition unit 44. According to one embodiment, the subtraction difference terms may be inverted by modifying corresponding propagate terms. This inversion may be performed according to the relationship described by Equations (9):

$$P[n] \text{ XOR } C[n-1]=S[n]{\sim}P[n] \text{ XOR } C[n-]={\sim}S[n] \tag{9}$$

A modified propagate term PM[n] may be defined by Equation (10):

$$PM[n]=P[n] \text{ XNOR } GP[n-1] \tag{10}$$

Accordingly, a modified propagate term PM[n]=P[n] if GP[n−1]=1, and PM[n]=~P[n] if ~GP[n−1]. The absolute difference |A−B| is reported at step 122. After reporting the absolute difference |A−B|, the method terminates.

Certain embodiments of the invention may provide one or more technical advantages. A technical advantage of one embodiment may be that a subtraction difference between two values is calculated and corrected if needed in order to determine the absolute difference between two values. The embodiment may require fewer computations than techniques that, for example, perform multiple subtractions to determine one absolute difference. Another technical advantage of one embodiment may be that a propagate term computed during the calculation of the subtraction difference is used to correct the subtraction difference. Using the already computed propagate term reduces the need to perform additional calculations to correct the subtraction difference. Accordingly, the embodiment may provide for a more efficient manner of calculating are absolute difference.

Although an embodiment of the invention and its advantages are described in detail, a person skilled in the art could make various alterations, additions, and omissions without departing from the spirit and scope of the present invention as defined by the appended claims.

What is claimed is:

1. A device for computing an absolute difference, comprising:

one or more adders operable to:
- receive a first value and a second value;
- determine a plurality of propagate terms according to the first value and the second value; and
- subtract the second value from the first value using the propagate terms to yield a subtraction difference;

one or more correctors, each corrector coupled to an adder and operable to:
- determine at one or more correctors whether the subtraction difference is negative;
- modify the subtraction difference according to the propagate terms to compute an absolute difference between the first value and the second value, if the subtraction difference is negative; and
- report the subtraction difference as the absolute difference between the first value and the second value, if the subtraction difference is not negative.

2. The device of claim 1, wherein the correctors are operable to determine the propagate terms according to the first value and the second value at the adders by applying an exclusive-or operation to each bit of a first sequence of bits corresponding to the first value and to each bit of a second sequence of bits corresponding to the second value.

3. The device of claim 1, wherein the correctors are operable to determine whether the subtraction difference is negative by:
- selecting a most significant subtraction difference bit of the subtraction difference; and
- determining whether the subtraction difference is negative according to the most significant subtraction difference bit.

4. The device of claim 1, wherein the correctors are operable to modify the subtraction difference according to the propagate terms to compute the absolute difference between the first value and the second value by:
- determining a false propagate term, the propagate terms comprising the false propagate term, the false propagate term corresponding to an incorrect bit of the subtraction difference; and
- modifying the subtraction difference according to the false propagate term.

5. The device of claim 1, wherein the correctors are operable to modify the subtraction difference according to the propagate terms to compute the absolute difference between the first value and the second value by:
- determining a false propagate term, the propagate terms comprising the false propagate term, the false propagate term corresponding to an incorrect bit of the subtraction difference; and
- inverting one or more bits of the subtraction difference according to the false propagate term to modify the subtraction difference, the one or more bits comprising a bit corresponding to the false propagate term and a most significant subtraction difference bit.

6. The device of claim 1, wherein the correctors are operable to modify the subtraction difference according to the propagate terms to compute the absolute difference between the first value and the second value by:
- determining a false propagate term, the propagate terms comprising the false propagate term, the false propagate term corresponding to an incorrect bit of the subtraction difference; and
- changing one or more of the propagate terms according to the false propagate term to modify the subtraction difference.

7. The device of claim 1, wherein the correctors are operable to modify the subtraction difference according to the propagate terms to compute the absolute difference between the first value and the second value by:
- generating a plurality of group propagate terms according to the propagate terms, the propagate terms comprising the false propagate term, the false propagate term corresponding to an incorrect bit of the subtraction difference;
- monitoring the group propagate terms to detect the false propagate term; and
- modifying the subtraction difference according to the false propagate term.

8. The device of claim 1, wherein the correctors are operable to modify the subtraction difference according to the propagate terms to compute the absolute difference between the first value and the second value by:
- generating a plurality of carry terms according to the propagate terms; and
- modifying the subtraction difference according to the carry terms.

9. The device of claim 1, wherein the correctors are operable to modify the subtraction difference according to the propagate terms to compute the absolute difference between the first value and the second value by:
- generating a plurality of carry terms according to the propagate terms, the propagate terms comprising a false propagate term, the false propagate term corresponding to an incorrect bit of the subtraction difference;
- monitoring the carry terms to detect the false propagate term; and
- modifying the subtraction difference according to the carry terms.

10. A device for computing an absolute difference, comprising:
- means for receiving a first value and a second value;
- means for determining a plurality of propagate terms according to the first value and the second value at one or more adders;
- means for subtracting the second value from the first value using the propagate terms to yield a subtraction difference;
- means for determining at one or more correctors whether the subtraction difference is negative;
- means for modifying the subtraction difference according to the propagate terms to compute an absolute difference between the first value and the second value, if the subtraction difference is negative; and
- means for reporting the subtraction difference as the absolute difference between the first value and the second value, if the subtraction difference is not negative.

* * * * *